United States Patent [19]

Forbes

[11] 4,041,131
[45] Aug. 9, 1977

[54] SULFUR RECOVERY PROCESS

[75] Inventor: James T. Forbes, Arlington Heights, Ill.

[73] Assignee: UOP Inc., Des Plaines, Ill.

[21] Appl. No.: 621,701

[22] Filed: Oct. 14, 1975

[51] Int. Cl.$^2$ .......................................... B01D 53/14
[52] U.S. Cl. ..................................... 423/242; 55/73; 423/244
[58] Field of Search ................... 423/242, 244, 574 L, 423/539; 55/73

[56] References Cited

U.S. PATENT DOCUMENTS

| | | | |
|---|---|---|---|
| 1,417,066 | 5/1922 | Howard | 55/73 X |
| 3,403,496 | 10/1968 | Ahlander et al. | 55/73 |
| 3,764,665 | 10/1973 | Groenendaal et al. | 423/244 X |
| 3,847,570 | 11/1974 | Gunther | 55/73 |

*Primary Examiner*—G. O. Peters

*Attorney, Agent, or Firm*—James R. Hoatson, Jr.; Richard D. Stone; William H. Page, II

[57] ABSTRACT

An improved sulfur recovery process is disclosed. Sulfur oxides are removed from stack gases with an acceptor. Sulfur oxides are recovered from the acceptor in a periodic regeneration step. The sulfur oxides in the regeneration off gas are concentrated by use of an absorber-stripper. The absorber absorbs sulfur oxides with an absorbent, and the stripper liberates concentrated sulfur oxides from the absorbent. Key feature of the process is use of two vessels to contain absorbent. Only when significant amounts of sulfur oxides are being absorbed is absorbent sent to a rich absorbent holding tank. Regenerated absorbent and absorbent from the absorber which does not contain much sulfur oxides are sent to the lean absorbent tank. Main advantage of operating with two tanks is optimum use of the stripper, which is fed with absorbent containing a constant and high concentration of sulfur oxides.

6 Claims, 1 Drawing Figure

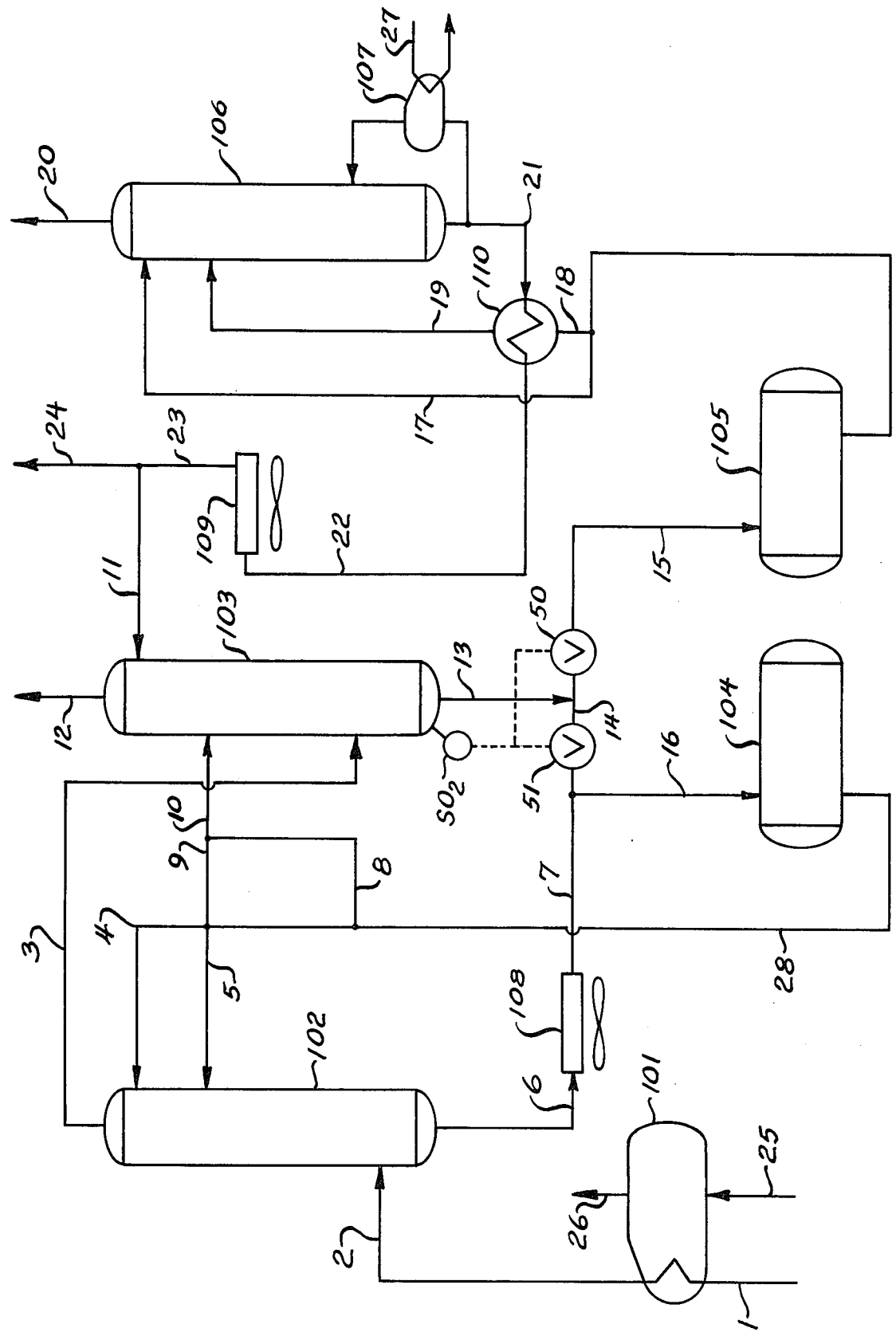

SULFUR RECOVERY PROCESS

BACKGROUND OF THE INVENTION

There is an ever-increasing demand for energy in all parts of the world. One of the problems encountered in the production of energy is the resultant production of polutants. One of the major pollutants is sulfur which is present in varying concentrations in both coal and oil.

There have been many attempts to remove sulfur from oil via hydrorefining and similar techniques. These techniques work well, as long as the oil does not contain too high a content of metal and particulates which complicate hydrorefining Efforts to desulfurize coal have not to date been proven on a commercial scale. The preferred way to remove sulfur pollutants from some heavy oils, and most coals, is to burn the fuel and to remove the sulfur oxides from the flue gas.

Many processes are known for removal of sulfur oxides from flue gases. One of the most interesting methods proposed commercially for the removal of sulfur oxides from flue gases is the Shell Flue Gas Desulfurization (SFGD) process. In this process, a dry acceptor material is used to capture sulfur oxides from flue gas. The acceptor material is periodically regenerated with a regeneration gas, usually a gas containing 50% or more of $H_2$ and relatively concentrated sulfur oxides are recovered in the regeneration off gas. The advantage of this process is that the acceptor material is dry so the complications and disposal problems associated with wet scrubbing systems are avoided. Some SFGD reactor designs provide for parallel passage of flue gas along side of the surface of the acceptor material. This avoids plugging of the acceptor with particulates.

The net effect of the SFGD process is to take very dilute sulfur oxides, primarily $SO_2$, in an oxygen and particulate containing stream, and to produce a relatively more concentrated stream of $SO_2$ gas in an oxygen-free atmosphere. Typical $SO_2$ concentrations in flue gases may range from only a few ppm up to 1 volume percent. These gases are concentrated and recovered in the regeneration of the acceptor materials to produce a regeneration gas containing about 2 to 10 volume percent of $SO_2$. When using the preferred regeneration material, hydrogen, the concentration of $SO_2$ may be up to about 10% with very pure hydrogen. Hydrogen such as produced in refineries and containing only about 50 mole percent hydrogen may be used, and in these instances, the regeneration off gas will contain only about 2 to 5 mole percent $SO_2$. This $SO_2$ is still rather dilute and not generally an acceptable feed to a Claus unit which converts $SO_2$ into Sulfur. To improve the purity of the $SO_2$, and also to minimize the swings in $SO_2$ concentration caused by the cyclic regeneration procedure used on the acceptor material, an absorber-stripper is used to produce concentrated $SO_2$.

Unfortunately, the cyclic nature of the regeneration is still felt in the down-stream absorber-stripper used to purify the regeneration off gas.

As the absorber-stripper is a very necessary part of an SFGD unit wherein very high concentrations of $SO_2$ are required, and because the stripping column in the absorber-stripper requires a significant portion of the total utilities demand of the SFGD process, the inefficient operation of the absorber-stripper caused by cylic swings in concentration of regeneration off gas has been a significant problem.

The SFGD process is, of course, well known in the art and forms no part of my invention. A general discussion of the SFGD process is given in an article entitled "New Tool Combats $SO_2$ Emissions", *The Oil and Gas Journal,* Oct. 29, 1973, page 81. The problem caused by cyclic operation of the absorber-stripper has also been given further study by the developers of that process. In U.S. Pat. No. 3,764,665 (Class 423/574, 244, 539, 576 and 55/73) the teachings of which are incorporated by reference, a significant improvement in the operation of the absorber-stripper was disclosed. Basically, the improvement was providing a large buffer zone between the absorber and the stripper. The function of the buffer zone was to be a large holding tank which would dampen out the swings in concentration of rich liquid from the absorber. Thus, the stripper would see a stream of almost constant composition. Another alternative disclosed was use of a smaller buffer zone with variation in flow of rich liquid from the buffer zone to the stripper based on the concentration of $SO_2$ in the rich liquid. Flow rich liquid to the stripper would be adjusted to maintain constant the production of $SO_2$ in the off gas from the stripper.

The improvement suggested in this patent, although a significant advance at the time, still was not a complete solution to the problem. Use of a very large buffer zone or holding tank meant that a very large vessel would be required to provide any significant improvement in operation. As the customary time of regeneration of the acceptor material is 30 to 100 minutes, the attempt to provide a buffer zone as analogous to providing a fly wheel on a one cylinder engine which operates at one revolution every 30 minutes. A fly wheel will be able to dampen out power pulses, but it will have to be an exceedingly large fly wheel. Another disadvantage of using a large buffer zone is that it forces the stripper to operate on the average concentration of $H_2S$. Thus, the easiest stripping occurs with the richest solutions, those containing the most $SO_2$. The function of the stripper is to concentrate $SO_2$ in the overhead vapor and to provide an $SO_2$ free stream. When very little $SO_2$ is in the gas being charged to the absorber, very little $SO_2$ will be in the rich liquid from the absorber, the stream is still lean. Mixing of streams rich and lean in $SO_2$ results in a significant loss of entropy in the system. Similarly, when there is very much $SO_2$ in the gas being charged to the absorber, the rich liquid from the absorber will have a very high concentration of $SO_2$. Mixing of this concentrated stream with the relatively dilute stream in the buffer zone also increases the entropy of the system.

The alternative teaching in this patent, namely, varying the flow to the stripper to make sure of a constant production of $SO_2$, also has its failings. In this mode of operation, flow to the absorber will be lowest when concentration of $SO_2$ in the absorbing liquid is highest. Similarly, when not much $SO_2$ is in the regeneration off gas, very high flows will be required to maintain a constant production of $SO_2$ in the stripper off gas. This also results in high flows of stripped liquid back to the absorber, at a time when the requirement of stripped liquid in the absorber is lowest because of the low concentration of $SO_2$ in the gas. Another problem caused by varying flow rates is that the mechanical design of the absorber is more complicated because of the greater variation in flow rates which must be tolerated.

I have now discovered a way to permit operation of the absorber-stripper wherein the production of $SO_2$ gas from the stripper is constant, and the liquid flow rates through both the absorber and the stripper are also constant. Further, the utilities required to strip $SO_2$ from the rich liquid are significantly less than disclosed in any other prior art schemes. Specifically, I am able to operate the absorber-stripper according to the method of the present invention at a utilities cost of only about one-half that of the rest of the prior art processes.

SUMMARY OF THE INVENTION

The present invention provides in a process for producing a purified sulfur oxide vapor stream by stripping sulfur oxides from a sulfur oxide containing absorbent stream in a stripper, wherein the concentration of sulfur oxides in absorbent varies cyclicly from low value (lean absorbent), to a high value (rich absorbent), and the absorbent is accumulated in a buffer zone of sufficient volume relative to absorbent flow, so that the sulfur oxides concentration of absorbent in the buffer zone is substantially constant despite periodic fluctuations of absorbent stream sulfur oxide concentration, THE IMPROVEMENT WHICH COMPRISES, providing as a substitute for said buffer zone a rich and a lean absorbent holding means, and charging to said rich absorbent holding means said rich absorbent, and charging to said lean absorbent holding means said lean absorbent, and charging to said stripper absorbent from said rich absorbent holding means.

In another embodiment, the present invention provides in a process for removing $SO_2$ from gas mixtures with a solid acceptor for $SO_2$ wherein the solid acceptor is periodically regenerated with a regeneration gas which produces regeneration off gas with an $SO_2$ concentration which varies periodically, at least a portion of the regeneration off gas is contacted in an absorber with an $SO_2$ selective liquid absorbent thereby producing a substantially $SO_2$-free regeneration off gas and a rich absorbent with an $SO_2$ concentration which varies periodically, said absorbent is charged to a buffer zone of sufficient volume relative to absorbent flow so that the $SO_2$ concentration of absorbent in the buffer zone remains substantially constant during the regeneration period of the solid acceptor, and rich absorbent is withdrawn from said buffer zone and charged to a stripping zone wherein heating of rich absorbent expels $SO_2$ therefrom and regenerates liquid absorbent, THE IMPROVEMENT WHICH COMPRISES, providing as a substitute for said buffer zone a first means to accumulate absorbent containing a relatively high concentration of $SO_2$, and a second means to accumulate absorbent containing a relatively low concentration of $SO_2$, and charging to said stripping zone at least a portion of the absorbent accumulated in said first means.

BRIEF DESCRIPTION OF THE DRAWING

The FIGURE is a flow diagram of an embodiment of the invention which is preferred when water is used as the sulfur dioxide selective liquid absorbent.

DESCRIPTION OF EMBODIMENTS

In accordance with the present process, the regeneration off gas is preferably first cooled or quenched with the formation of a condensate after which the cooled off gas, with or without compression, is contacted with a liquid absorbent. The regeneration off gas is cooled to remove steam which is usually present in such off gases. Quenching or cooling of the gas stream permits this steam to be removed as water. Where the absorbent is water, the condensate can be mixed with cool, compressed off gas prior to contacting with liquid absorbent. Part of the formed condensate can also be used to pre-cool the regeneration off gas by injecting it, in liquid form, into the regeneration off gas.

In addition to water, other suitable liquid absorbents may be used. These should have a high selectivity for sulfur dioxide and a high absorption capacity. Preferably, they should have a low selectivity for carbon dioxide. Good absorbents must also be easily regenerable, either by heating or by a change in pressure. Simple heating of absorbent to regenerate it is preferred. Examples of preferred absorbents include: n-methyl, pyrrolidone, dimethyl, analine, Sulfolane sulfonel (i.e., a mixture of Sulfolane, amines and water) and the like.

The absorbed sulfur dioxide is expelled from the absorbent by heating in a stripping zone. If water is the absorbent, direct injection of steam into the column may provide heat and vapor for stripping. If water is not the absorbent, then some indirect form of heat exchange should be used.

The process according to the invention is carried out in such a way that the liquid from the absorber is sent to a rich absorber liquid holding tank when, and only when, there is a significant concentration of $SO_2$ in the absorbing liquid. In those periods of operation when little $SO_2$ is absorbed in the absorbing liquid, the liquid from the absorber is sent to the lean absorbing tank. Determination of whether liquid from the absorber should be sent to either the rich or the lean tank can be made based on either an actual analysis of some property of the liquid leaving the absorber, e.g., $SO_2$ concentration, or may be based on an analysis of some stream entering the process, i.e., $SO_2$ concentration of regeneration off gas. The pH of absorbent liquid may be used, but is not a preferred control scheme because very little change in pH occurs, these streams are all too concentrated for pH to be a very effective control variable. Alternatively, the operation may be synchronized with the regeneration sequence. Thus, if a typical regeneration lasts one hour, it would be possible to determine, by local testing, that two minutes after the regeneration sequence starts a significant concentration of $SO_2$ will appear in the regeneration off gas. This will produce significant concentrations of $SO_2$ in liquid from the absorber within five minutes after the regeneration started, so that five minutes after a regeneration starts, liquid from the absorber will be sent to the rich tank. Thirty-five minutes after the start of the regeneration, only a very low level of $SO_2$ is generated and at this point liquid from the absorber is sent to the lean tank.

The liquid to the absorber should be stripped liquid from the stripper. Liquid from the lean tank may also be used, but it will not be quite as efficient as stripped liquid. When several absorbing streams are used, the stripped liquid should be the uppermost stream or clean-up absorbent. Flow of liquid to the absorber may be constant, or alternatively it may be increased slightly as the $SO_2$ concentration of the regeneration gas increases. Either of these modes of operation is more favorable to reducing $SO_2$ emissions than the operation indicated by U.S. Pat. No. 3,764,665 wherein flow to the stripper and absorber decrease as $SO_2$ concentration increases.

The regeneration off gas is preferably contacted with the liquid absorbent at a low temperature to promote maximum capture of $SO_2$. This temperature should not be too low, which would cause significant expense in reheating this liquid as it entered the stripper. Suitable absorption temperatures range between 10° and 60° C, preferably 25° to 50° C.

The pressure used during the absorption step is generally between 1 and 10 atm, absolute, preferably about 1.3 to about 6.5 atm. Higher pressures promote capture of $SO_2$ from the gas, but also necessitates slightly more expensive vessels to withstand this pressure and slightly greater pumping costs.

The acceptor material used to capture the $SO_2$ gas from the flue gas is not a critical part of the present invention. It is believed that all solid acceptor materials which are subjected to cyclic regeneration will be benefited by the practice of the present invention. The best material known now consists of copper oxide on an alumina support. The advantage of this material is that it will react with sulfur dioxides at 300° to 500° C temperatures encountered in flue gases and can also be regenerated at about the same temperature. The regeneration gas used is preferably hydrogen or a mixture of hydrogen and other gases. Many times hydrogen is available in admixture with light hydrocarbons such as methane and ethane and will be used as such for reasons as economy. Steam is frequently added to the regeneration gas to provide temperature control and to minimize coking of the catalyst caused by the presence of hydrocarbons in the reduction gas.

The $SO_2$ gas produced by the stripper of the present invention will usually be more than 90 mole percent pure. It may be used as such, or given further treatment to convert it into sulfur. A common treatment for conversion of $SO_2$ to sulfur is to reduce some or all of the gas to $H_2S$. In the Claus unit, the $H_2S$ and $SO_2$ are reacted to form elemental sulfur, but details of the operation of the Claus process are so well known that further discussion thereof is not necessary.

EXAMPLE AND DESCRIPTION OF DRAWING

The process of the invention will now be further illustrated by reference to the accompanying drawing.

The embodiment shown is particularly suitable when water is the absorbent. The various steam generation and heat recovery systems shown are optional. In general, large scale units make more elaborate, heat recovery systems attractive, while small scale units cannot afford the capital cost of improved heat recovery.

For ease in understanding the drawing, each numbered flow stream will be described in turn. The composition and conditions of each stream will be shown in the attached tables. The tables will be divided into two parts, one part shows operation a few minutes into the regeneration phase ($SO_2$ rich phase) and the other part shows operation at the end of the regeneration cycle ($SO_2$ lean phase). The flows are, of course, not constant at either of these values, but they represent the type of streams encountered during the cyclic regeneration of the acceptor material. Thus, the $SO_2$ concentration ranges from 0 to about 8 mole percent in the incoming gas.

TABLE I $SO_2$ Rich Phase

| Strm | PSIG | Temp F | MMBTU/HR | $H_2$ | Meth | Eth | Prop | $N_2$ | $CO_2$ | $SO_2$ | $H_2O$ | Total | LBS/HR |
|---|---|---|---|---|---|---|---|---|---|---|---|---|---|
| 1 | 6. | 750. | 21.21 | 17.1 | 2.2 | 0.0 | 0.0 | 0.0 | 46.0 | 77.7 | 792.7 | 935.7 | 21337.1 |
| 2 | 5. | 350. | 17.68 | 17.1 | 2.2 | 0.0 | 0.0 | 0.0 | 46.0 | 77.7 | 792.7 | 935.7 | 21337.1 |
| 3 | 5. | 130. | 0.66 | 17.1 | 2.2 | 0.0 | 0.0 | 0.0 | 46.0 | 77.6 | 18.0 | 161.0 | 7391.8 |
| 4 | 30. | 115. | 5.58 | | | | | | | 0.1 | 5632.0 | 5632.1 | 101382.3 |
| 5 | 30. | 115. | 5.58 | | | | | | | 0.1 | 5632.0 | 5632.1 | 101382.3 |
| 6 | 40. | 190. | 28.17 | | | | | | | 0.2 | 12038.7 | 12038.9 | 216709.9 |
| 7 | 30. | 115. | 11.92 | | | | | | | 0.2 | 12038.7 | 12038.9 | 216709.9 |
| 8 | 30. | 115. | 6.67 | | | | | | | 0.1 | 6732.6 | 6732.7 | 121193.6 |
| 9 | 30. | 115. | 0.0 | | | | | | | 0.0 | 0.0 | 0.0 | 0.0 |
| 10 | 30. | 115. | 6.67 | | | | | | | 0.1 | 6732.6 | 6732.7 | 121193.6 |
| 11 | 30. | 115. | 10.12 | | | | | | | 0.1 | 10221.6 | 10221.7 | 183997.6 |
| 12 | 5. | 120. | 0.37 | 17.1 | 12.2 | 0.0 | 0.0 | 0.0 | 46.0 | 0.0 | 6.1 | 71.4 | 2205.5 |
| 13 | 30. | 129. | 19.60 | | | | | | | 77.9 | 16966.1 | 17043.9 | 310377.4 |
| 14 | 30. | 129. | 5.87 | | | | | | | 0.3 | 5931.3 | 5931.6 | 106783.1 |
| 15 | 5. | 129. | 13.73 | | | | | | | 77.6 | 11034.7 | 11112.3 | 203594.2 |
| 16 | 5. | 115. | 17.79 | | | | | | | 0.5 | 17970.1 | 17970.6 | 323493.0 |
| 17 | 40. | 129. | 9.45 | | | | | | | 53.4 | 7596.6 | 7650.0 | 140159.3 |
| 18 | 40. | 129. | 4.28 | | | | | | | 24.2 | 3438.1 | 3462.3 | 63434.9 |
| 19 | 30. | 210. | 9.28 | | | | | | | 24.2 | 3438.1 | 3462.3 | 63434.9 |
| 20 | 5. | 130. | 0.24 | | | | | | | 77.4 | 9.8 | 87.2 | 5135.2 |
| 21 | 50. | 235. | 34.73 | | | | | | | 0.2 | 11025.0 | 11025.1 | 198459.1 |
| 22 | 0. | 210. | 29.72 | | | | | | | 0.2 | 11025.0 | 11025.1 | 198459.1 |
| 23 | 30. | 115. | 10.91 | | | | | | | 0.2 | 11025.0 | 11025.1 | 198459.1 |
| 24 | 30. | 115. | 0.80 | | | | | | | 0.0 | 803.4 | 803.4 | 14461.5 |
| 25 | 175. | 80. | 0.06 | | | | | | | | 175.7 | 175.7 | 3162.0 |
| 26 | 150. | 365. | 3.59 | | | | | | | | 175.7 | 175.7 | 3162.0 |
| 27 | 250. | 407. | 18.77 | | | | | | | | 886.0 | 886.0 | 15947.4 |
| 28 | 30. | 115. | 17.82 | | | | | | | 0.3 | 17996.6 | 17996.9 | 323958.2 |

TABLE II $SO_2$ Lean Phase

| Strm | PSIG | Temp F. | MMBTU/HR | $H_2$ | Meth | Eth | Prop | $N_2$ | $CO_2$ | $SO_2$ | $H_2O$ | Total | LBS/HR |
|---|---|---|---|---|---|---|---|---|---|---|---|---|---|
| 1 | 6. | 750. | 16.85 | 191.8 | 2.2 | 0.0 | 0.0 | 0.0 | 46.0 | 0.0 | 618.0 | 858.0 | 13566.4 |
| 2 | 5. | 350. | 14.03 | 191.8 | 2.2 | 0.0 | 0.0 | 0.0 | 46.0 | 0.0 | 618.0 | 858.0 | 13566.4 |
| 3 | 5. | 130. | 0.93 | 191.8 | 2.2 | 0.0 | 0.0 | 0.0 | 46.0 | 0.0 | 30.3 | 270.3 | 2987.0 |
| 4 | 30. | 115. | 5.58 | | | | | | | 0.1 | 5632.0 | 5632.1 | 101382.3 |
| 5 | 30. | 115. | 5.58 | | | | | | | 0.1 | 5632.0 | 5632.1 | 101382.3 |
| 6 | 40. | 190. | 24.25 | | | | | | | 0.2 | 11851.7 | 11851.9 | 213344.1 |
| 7 | 30. | 115. | 11.73 | | | | | | | 0.2 | 11851.7 | 11851.9 | 213344.1 |
| 8 | 30. | 115. | 6.67 | | | | | | | 0.1 | 6732.6 | 6732.7 | 121193.6 |
| 9 | 30. | 115. | 0.0 | | | | | | | 0.0 | 0.0 | 0.0 | 0.0 |
| 10 | 30. | 115. | 6.67 | | | | | | | 0.1 | 6732.6 | 6732.7 | 121193.6 |
| 11 | 30. | 115. | 10.12 | | | | | | | 0.1 | 10221.6 | 10221.7 | 183997.6 |
| 12 | 5. | 120. | 0.76 | 191.8 | 2.2 | 0.0 | 0.0 | 0.0 | 46.0 | 0.0 | 22.3 | 262.3 | 2844.0 |

TABLE II-continued

| | | | | SO$_2$ Lean Phase | | | | Mols/Hr | | | | | |
|---|---|---|---|---|---|---|---|---|---|---|---|---|---|
| Strm | PSIG | Temp F. | MMBTU/HR | H$_2$ | Meth | Eth | Prop | N$_2$ | CO$_2$ | SO$_2$ | H$_2$O | Total | LBS/HR |
| 13 | 30. | 116. | 16.95 | | | | | | | 0.2 | 16962.1 | 16962.4 | 305334.0 |
| 14 | 30. | 116. | 16.95 | | | | | | | 0.2 | 16962.1 | 16962.4 | 305334.0 |
| 15 | 5. | 116. | 0.0 | | | | | | | 0.0 | 0.0 | 0.0 | 0.0 |
| 16 | 5. | 115. | 28.68 | | | | | | | 0.4 | 28813.9 | 28814.3 | 518678.1 |
| 17 | 40. | 116. | 6.55 | | | | | | | 45.9 | 6522.6 | 6568.5 | 120344.4 |
| 18 | 40. | 116. | 4.53 | | | | | | | 31.7 | 4512.1 | 4543.8 | 83249.9 |
| 19 | 30. | 210. | 12.18 | | | | | | | 31.7 | 4512.1 | 4543.8 | 83249.9 |
| 20 | 5. | 130. | 0.24 | | | | | | | 77.4 | 9.8 | 87.2 | 5135.2 |
| 21 | 50. | 235. | 34.73 | | | | | | | 0.2 | 11025.0 | 11025.1 | 198459.1 |
| 22 | 0. | 196. | 27.08 | | | | | | | 0.2 | 11025.0 | 11025.1 | 198459.1 |
| 23 | 30. | 115. | 10.91 | | | | | | | 0.2 | 11025.0 | 11025.1 | 198459.1 |
| 24 | 30. | 115. | 0.80 | | | | | | | 0.0 | 803.4 | 803.4 | 14461.5 |
| 25 | 175. | 80. | 0.05 | | | | | | | | 140.8 | 140.8 | 2534.6 |
| 26 | 150. | 365. | 2.88 | | | | | | | | 140.8 | 140.8 | 2534.6 |
| 27 | 250. | 407. | 18.77 | | | | | | | | 886.0 | 886.0 | 15947.4 |
| 28 | 30. | 115. | 17.82 | | | | | | | 0.3 | 17996.6 | 17996.9 | 323958.2 |

Regeneration off gas is charged via line 1 to steam generator 101. Water is added to steam generator 101 via line 25, while steam produced is removed via line 26. This stream is 750° F, which is hot enough to generate useful steam, hence the indication of a steam generator in the drawing. A steam generator is not necessary, but is highly desirable to recover the heat in this stream. Line 2 passes cooled gas from steam generator 101 to the quench column 102. Quench column 102 rapidly cools the hot gas and condenses steam in the regeneration gas. The step not only concentrates the SO$_2$, by removing the steam diluent, but also makes the stream less corrosive by cooling. It would be possible to also use a heat exchanger or fin-fan cooler in place of quench tower 102, however, the first drops of water and SO$_2$ formed in a heat exchanger would be extremely corrosive. It is also difficult to provide enough heat-exchanger surface to quickly cool this stream to a low temperature. Accordingly, a quench tower is the cheapest and best way to cool the stream. This quench column may be designed for either a countercurrent or cocurrent operation. Line 3 removes non-condensed gas containing the bulk of the SO$_2$ entering the system, overhead from quench tower 102, and charges it into absorber 103. Water enters quench tower 102 via lines 4 and 5. Line 4 provides water flow to the top of the quench tower, while line 5 supplies a lower level quench stream. Liquid collected in the bottom of quench tower 102 is removed via line 6, passed through cooler 108 and then removed via line 7 for storage, usually in lean storage tank 104. Water is withdrawn from lean tank 104 and charged via line 28 to lines 4 and 5, previously discussed, to supply quench requirements. Water from lean tank 104 is also charged via lines 28, 8 and 10 into absorber 103, at an intermediate position thereof. Line 9 connecting lines 5 and 10 provides for level control of absorbent in the lean tank 104.

Most of the lean absorbent enters the top of absorber 103 via line 11. The remainder enters an intermediate portion of absorber 103 via line 10. Material not absorbed in absorber 103 is removed via line 12, and is preferably sent to the furnace supplying flue gas so that any sulfur compounds remaining may be re-absorbed.

Rich liquid from absorber 103 is removed via line 13 and charged via lines 14 and 16 to lean tank 104 or via line 15 to rich tank 105. Rich absorbent, water with lots of SO$_2$ dissolved therein, leaves vessel 105 via line 17 and is charged to the upper portion of stripper 106. Some rich liquid is heat exchanged via lines 18 and 19 with hot stripped liquid in heat exchanger 110 and injected into the middle of stripper 106. SO$_2$ rich gas is recovered via line 20 from absorber 106. The heat input required for stripping is supplied in heat exchanger 107 with condensing steam in line 27. Stripped liquid from the bottom of stripper 106 is recovered via line 21, heat exchanged with charge to stripping column in heat exchanger 110, and charged to a fin-fan cooler 109 via line 22. After trim cooling in the fin-fan cooler, stripped liquid is removed via line 23 and charged either to storage via line 24 or recycled to the absorber via line 11.

In this embodiment, flow control from the bottom of absorber 103 to either lean tank 104 or rich tank 105 is controlled by an SO$_2$ analyzer-controller. When there is a significant amount of SO$_2$ in the regeneration gas, then valve 50 opens, valve 51 closes and the rich solution will flow via lines 13 and 15 to rich tank 105. When the SO$_2$ concentration in the rich liquid from the absorber is below a predetermined value, then valve 50 closes, valve 51 opens and the rich liquid will flow via lines 13, 14 and 16 into lean tank 104. Flow to quench tower 102 is preferably held constant, because the gas coming in is always hot, and there is always the possibility of some trace amount of SO$_2$ being present, so it is desirable to quench and cool this stream.

The level in tank 104 is controlled by charging lean absorbent into absorber 103 if the level in tank 104 becomes too high. The level in tank 105 is not held constant, but is allowed to swing. Tank 105 periodically accumulates and discharges absorbent containing high concentrations of SO$_2$. Thus, in the present invention, swings in SO$_2$ concentration in the incoming gas stream are absorbed as rising and falling levels of liquid in tank 105. This permits operation of stripper 106 with a constant liquid flow of almost constant composition.

The prior art process has an almost identical flow stream, however vessels 104 and 105 are combined into a single vessel, which would have to be much larger in total volume than the sum of the volumes of tanks 104 and 105. If tanks 104 and 105 were combined, the stripper 106 would have to be somewhat larger and would consume twice the utilities as does the stripper of the present invention. The reason for this significant savings in utility cost is that the stripper of the present invention operates with a constant flow of relatively concentrated rich liquid in contrast to a varying flow of relatively dilute absorbent.

The savings in utilities is about 50%, in looking only at the absorber-stripper section. The savings in utilities on the overall process are still significant. A SFGD process operated in accordance with the present invention required only about 85% of the utilities required by a SFGD process operated without the benefits of the present invention.

I claim as my invention:

1. In a process for removing sulfur oxides from gas mixtures with a solid acceptor for sulfur oxides wherein the solid acceptor is periodically regenerated with a steam-diluted reducing gas and the regeneration off-gas is charged to an absorber-stripper to produce a concentrated sulfur oxides gas stream the improvement which comprises:
    a. cooling the regeneration off-gas to a temperature at which a substantial part of the steam contained therein condenses;
    b. contacting in a contacting zone the cooled regeneration off-gas with a sulfur dioxide-selective liquid absorbent thereby obtaining a substantially sulfur dioxide free regeneration off-gas and a sulfur dioxide rich liquid absorbent, wherein the sulfur dioxide content of the sulfur dioxide rich liquid varies periodically with the periodic regeneration of the solid acceptor;
    c. passing said sulfur dioxide rich liquid absorbent, during periods of operation which produce rich absorbent containing a relatively high sulfur dioxide content, to a rich absorbent holding tank;
    d. passing said sulfur dioxide rich liquid absorbent, during periods of operation in which said rich absorbent contains a relatively low amount of sulfur dioxide, to a lean absorbent holding tank;
    e. withdrawing a stream of sulfur dioxide rich liquid absorbent from said rich holding tank and passing it at a substantially constant rate to a stripping zone;
    f. heating in said stripping zone the sulfur dioxide rich liquid absorbent from step (e) to a temperature at which sulfur dioxide gas is expelled thereby regenerating the liquid absorbent;
    g. recovering expelled sulfur dioxide gas,
    h. passing said regenerated liquid absorbent to the contacting zone of step (b) to further absorb sulfur dioxide; and,
    i. supplying at least intermittently, as a portion of the absorbent to step (b), absorbent from the lean absorbent holding tank, whereby variation of the sulfur dioxide content of the regeneration off-gas is accommodated by varying levels in the rich absorbent holding tank.

2. Process of claim 1 wherein the absorbent is water.

3. Process of claim 1 wherein rich absorbent is heated by direct injection of steam.

4. Process of claim 1 wherein the quenching liquid comprises absorbent from said lean absorbent holding tank.

5. Process of claim 1 wherein the regeneration off gas contacts the liquid absorbent at a temperature of 10° to 60° C and a pressure of 1 to 10 atm.

6. Process of claim 1 wherein absorbent flow to said rich absorbent tank and said lean absorbent tank from said contacting zone is controlled by a timer which cycles in synchronism with the periodic regeneration of the solid acceptor.

* * * * *